(No Model.)
G. W. CHAPMAN.
HAME TUG.
No. 431,437. Patented July 1, 1890.
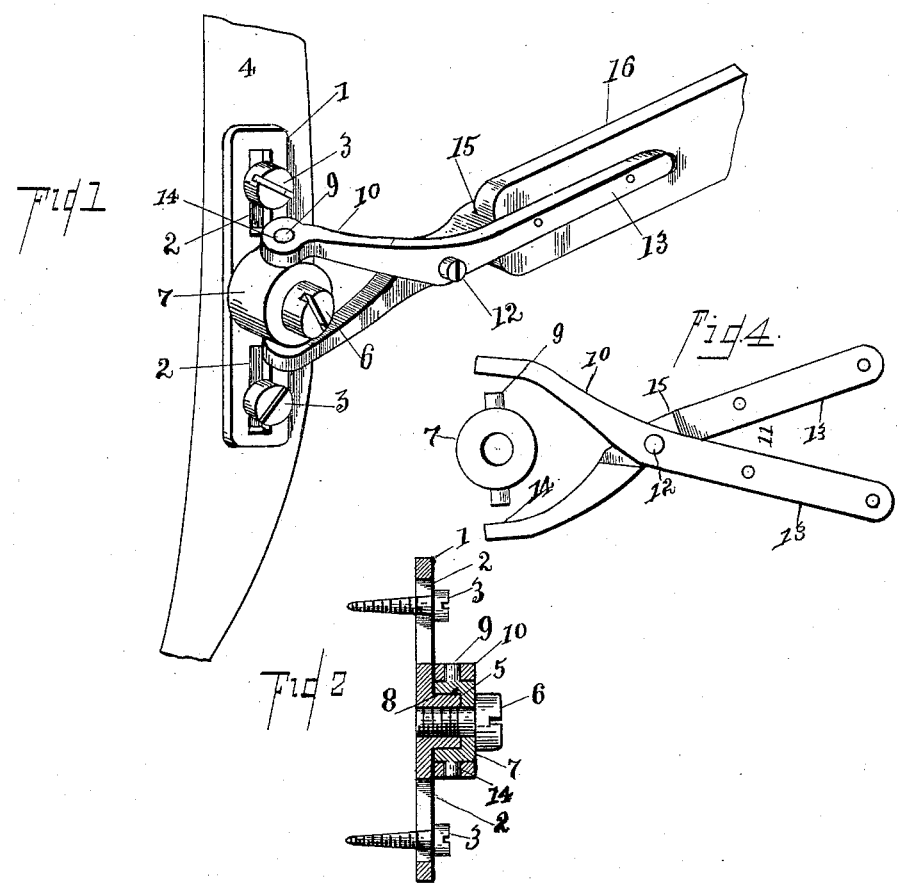
Witnesses
T. Willoughby
H. J. Riley
Inventor
George W. Chapman
By his Attorneys
C. A. Snow & Co.

UNITED STATES PATENT OFFICE.

GEORGE W. CHAPMAN, OF GENEVA, NEBRASKA.

HAME-TUG.

SPECIFICATION forming part of Letters Patent No. 431,437, dated July 1, 1890.

Application filed March 31, 1890. Serial No. 346,076. (No model.)

*To all whom it may concern:*

Be it known that I, GEORGE W. CHAPMAN, a citizen of the United States, residing at Geneva, in the county of Fillmore and State of Nebraska, have invented a new and useful Hame-Tug, of which the following is a specification.

The invention relates to improvements in hame-tugs.

The object of the present invention is to provide a simple and comparatively inexpensive hame-tug adapted to withstand a great amount of wear and capable of being quickly adjusted vertically on the hame to enable the draft to be the same on various-sized horses.

The invention consists in the construction and novel combination and arrangement of parts hereinafter fully described, illustrated in the accompanying drawings, and pointed out in the claims hereto appended.

In the drawings, Figure 1 is a perspective view of the hame-tug shown applied in operative position to a hame. Fig. 2 is a detail sectional view. Fig. 3 is a detail view of the swivel-collar. Fig. 4 is a detail view of the device removed from the hame with the parts separated.

Referring to the accompanying drawings, 1 designates a plate, which is constructed of suitable metal and provided with the longitudinal slots 2, through which pass bolts 3, that secure the plate to a hame 4. The longitudinal slots 2 extend from the ends of the plate to within a short distance of the central portion and permit the hame-tug to be quickly adjusted vertically on the hame and thereby enable the draft to be the same on various-sized animals. The central portion of the clip-plate 1 is provided with an annular flange 5, that extends out from the plate and has its interior threaded and adapted to be engaged by a screw 6, which swivels a collar 7 to the clip-plate. The collar is provided with a central opening 8, that registers with the opening of the annular flange 5, and it is provided with oppositely-disposed lugs 9, that engage and hinge to the collar a tug 10 that is composed of similar sections 11. The sections 11 are pivoted together at 12, and have formed integral with them diverging arms 13, that are provided with openings 14 to receive the oppositely-disposed lugs 9 of the swiveled collar 7, whereby the tug 10 is hinged to the swivel-collar and is rendered capable of lateral motion. The collar 7 is swiveled to the clip-plate and permits a rotary motion of the hame-tug, which motion, together with the lateral motion of the tug, enables the hame-tug to readily yield to the motion of the animal and enables the animal to draw the load with great ease and prevents its shoulders becoming injured by the rubbing of the parts of the harness. One of the sections 11 is provided with a recessed portion 15, in which is secured the end of the trace 16 or a leather portion of a hame-tug, which portion 16 is secured between the sections by bolts, rivets, screws, or the like, and it may readily be removed when desired.

It will readily be seen that the hame-tug is simple and inexpensive in construction and is adapted to be adjusted vertically on the hame to enable the draft to be changed to suit various-sized animals, and is capable of yielding and conforming to the motions of the animal to permit it to draw the load easily and to prevent the parts of the harness rubbing and making the shoulders of the animal sore; and I desire it to be understood that I do not limit myself to the precise details of construction herein shown and described, as I may without departing from the spirit of the invention make minor changes therein.

From the foregoing description and the accompanying drawings the construction, operation, and advantages of the invention will readily be understood.

What I claim is—

1. The combination, in a hame-tug, of the clip-plate adapted to be secured to a hame, the collar 7, swiveled to the plate and turning thereon, and the tug composed of sections pivoted together and engaging the collar, substantially as described.

2. The combination, in a hame-tug, of the clip-plate adapted to be bolted to a hame and provided with the annular flange 5, the collar swiveled to the flange and having the oppositely-disposed lugs, and the sections 11, pivoted together and engaging the lugs, substantially as described.

3. The combination, in a hame-tug, of the clip-plate adapted to be bolted to a hame and provided with the annular flange 5, the collar swiveled to the flange and provided with the oppositely-disposed lugs 9, and the sections 11, pivoted together and having diverging arms 13, provided with openings to receive the lugs 9, substantially as described.

4. The combination, in a hame-tug, of the clip-plate provided with slots 2 and having the annular flange 5 arranged between the slots, the collar 7, swiveled to the annular flange and provided with oppositely-disposed lugs, and the sections pivoted together and provided with the recess 15 and having the diverging arms hinged to the collar by the lugs 9, substantially as and for the purpose described.

In testimony that I claim the foregoing as my own I have hereto affixed my signature in presence of two witnesses.

GEORGE W. CHAPMAN.

Witnesses:
R. A. MATTESON,
J. Q. STULTZ.